United States Patent
Ando

(10) Patent No.: US 10,260,196 B2
(45) Date of Patent: Apr. 16, 2019

(54) EMULSION COMPOSITION COMPRISING AN AMINOALKYL GROUP- AND POLYOXYALKYLENE GROUP-CONTAINING SILOXANE

(71) Applicant: Shin-Etsu Chemical Co., Ltd., Tokyo (JP)

(72) Inventor: Yuji Ando, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 15/639,867

(22) Filed: Jun. 30, 2017

(65) Prior Publication Data

US 2018/0002861 A1    Jan. 4, 2018

(30) Foreign Application Priority Data

Jul. 1, 2016    (JP) ................. 2016-131327

(51) Int. Cl.
| | |
|---|---|
| *D06M 15/647* | (2006.01) |
| *D06M 15/643* | (2006.01) |
| *C08G 77/14* | (2006.01) |
| *C08G 77/26* | (2006.01) |
| *C08L 83/08* | (2006.01) |
| *D06M 101/06* | (2006.01) |
| *D06M 101/32* | (2006.01) |

(52) U.S. Cl.
CPC .......... *D06M 15/647* (2013.01); *C08G 77/14* (2013.01); *C08G 77/26* (2013.01); *C08L 83/08* (2013.01); *D06M 15/6436* (2013.01); *C08L 2201/52* (2013.01); *C08L 2203/12* (2013.01); *D06M 2101/06* (2013.01); *D06M 2101/32* (2013.01); *D06M 2200/00* (2013.01)

(58) Field of Classification Search
None
See application file for complete search history.

(56) References Cited

U.S. PATENT DOCUMENTS

| | | | | |
|---|---|---|---|---|
| 4,996,280 A | * | 2/1991 | Saho | C08G 77/24 528/15 |
| 5,075,403 A | * | 12/1991 | Kirk | B01D 19/0409 528/15 |
| 5,262,088 A | * | 11/1993 | Hill | B01D 19/0409 510/343 |
| 2002/0114771 A1 | * | 8/2002 | Nakanishi | A61K 8/891 424/70.12 |
| 2004/0003473 A1 | * | 1/2004 | Glenn | A61K 8/898 8/405 |
| 2004/0234247 A1 | * | 11/2004 | Nakashika | G11B 27/034 386/334 |
| 2004/0242911 A1 | * | 12/2004 | Tonomura | C07F 7/12 556/410 |
| 2006/0280716 A1 | * | 12/2006 | Czech | A61K 8/898 424/70.122 |
| 2008/0139731 A1 | * | 6/2008 | Lawson | C08L 83/04 524/447 |
| 2008/0234441 A1 | * | 9/2008 | Divins | C07F 7/0874 525/478 |
| 2016/0177037 A1 | * | 6/2016 | Huggins | C08G 77/26 525/436 |
| 2017/0172901 A1 | * | 6/2017 | Kerl | A61Q 5/10 |

FOREIGN PATENT DOCUMENTS

| | | | |
|---|---|---|---|
| EP | 058493 A1 | * | 8/1982 |
| JP | 9-53016 A | | 2/1997 |

* cited by examiner

*Primary Examiner* — Marc S Zimmer
(74) *Attorney, Agent, or Firm* — Birch, Stewart, Kolasch & Birch, LLP

(57) ABSTRACT

One of the purposes of the present invention is to provide an emulsion composition which has a small initial diameter and good stability with time and dilution stability. Further, another purpose of the present invention is to provide an emulsion composition which has high adsorption ability to fibers and provides a hydrophilic surface of the fibers. Thus, the present invention is an emulsion composition comprising water and an aminoalkyl group and polyoxyalkylene group-containing siloxane represented by the following general formula (1): $(R^1{}_3SiO_{1/2})_k(R^1{}_2SiO_{2/2})_p(R^1{}_1SiO_{3/2})_q(SiO_{4/2})_r$ (1) wherein $R^1$ is, independently of each other, a hydroxyl group, an alkoxyl group, a substituted or unsubstituted monovalent hydrocarbon group having 1 to 20 carbon atoms, or a group represented by the following formula (2), (3) or (6): —$(CR^2H)_a$—$(NHCH_2CH_2)_b$—$NH_2$ (2), —$(CR^2H)_c$—O—$(C_2H_4O)_d$—$(C_3H_6O)_e$—$R^3$ (3), —$(CR^2H)_f$—$(R^5{}_2SiO)_s$—$SiR^5{}_3$ (6); provided that at least one of $R^1$ is the group represented by the formula (2) and at least one of $R^1$ is a group represented by the formula (3).

3 Claims, No Drawings

EMULSION COMPOSITION COMPRISING AN AMINOALKYL GROUP- AND POLYOXYALKYLENE GROUP-CONTAINING SILOXANE

CROSS REFERENCE

This application claims the benefits of Japanese Patent Application No. 2016-131327 filed on Jul. 1, 2016, the contents of which are herein incorporated by reference.

FIELD OF THE INVENTION

The present invention relates to an emulsion composition comprising an aminoalkyl group- and polyoxyalkylene group-containing siloxane.

Amino-modified siloxanes have been used in the many kinds of field such as fiber treating agents, release agents, glazing agents and cosmetics, in particular hair cosmetics. The amino-modified siloxanes were often used in a diluted form in a solvent. However, recently, a bad influence on the environment or health is concerned and, therefore, the amino-modified siloxane is used mostly in an emulsion form.

However, amino-modified siloxanes are highly hydrophobic and difficult to be emulsified. Emulsion particles have a large diameter and storage stability of the emulsion is poor. Therefore, an emulsion composition comprising an amino-modified siloxane having a small particle diameter and good storage stability is required.

Further, an emulsion composition comprising an amino-modified siloxane which has good adsorb ability to fibers and has good water absorbability is required. For instance, Japanese Patent Application Laid-Open No. Hei 9-53016 describes a fiber treating agent comprising an amino-functionalized polyorganosiloxane represented by the following formula, a surfactant, water and an acid.

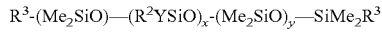

wherein Y is —$(CH_2)_3NHZ$, Z is a hydrogen atom, an alkyl group having 1 to 4 carbon atoms or a 2-aminoethyl group, $R^3$ is a methyl group, an alkoxy group having 1 to 2 carbon atoms or a hydroxyl group, $R^2$ is $R^3$ or -$(Me_2Si)_z$—$SiMe_2R^3$.

The emulsion composition comprising the conventional amino-modified siloxane has high adsorbability to fibers, but there is a problem such that a surface of fibers treated with the emulsion composition becomes water-repellent.

PRIOR LITERATURE

[Patent Literature]

[Patent Literature 1] Japanese Patent Application Laid-Open No. Hei 9-53016

DISCLOSURE OF THE INVENTION

Problems to be Solved by the Invention

One of the purposes of the present invention is to provide an emulsion composition which has a small initial diameter of particles and good stability with time and good dilution stability. Further, the other purpose of the present invention is to provide an emulsion composition which has high adsorb ability to fibers and makes surface of fibers hydrophilic.

Means to Solve the Problems

To solve the aforesaid problems, the present inventor has made research and found that the emulsion composition comprising the aminoalkyl group- and polyoxyalkylene group-containing siloxane represented by the following general formula (1) and water has a small initial diameter of particles, improved stability with time and improved dilution stability. Further, the emulsion composition has high adsorb ability to fibers and makes on a surface of fibers hydrophilicity by treatment with it.

Thus, the present invention is to provide an emulsion composition comprising water and an aminoalkyl group- and polyoxyalkylene group-containing siloxane represented by the following general formula (1):

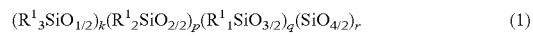

wherein $R^1$ is, independently of each other, a hydroxyl group, an alkoxyl group, a substituted or unsubstituted monovalent hydrocarbon group having 1 to 20 carbon atoms, or a group represented by the following formula (2), (3) or (6), provided that at least one of $R^1$ is the group represented by the following formula (2) and at least one of $R^1$ is a group represented by the following formula (3), k, p, q and r are, independently of each other, an integer of 0 or more, provided that a total of k, p, q and r is larger than zero, and a bonding order of the parenthesized siloxane units is not limited,

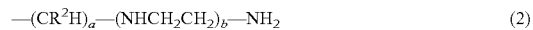

wherein a is an integer of from 2 to 11, b is an integer of from 0 to 10, and $R^2$ is, independently of each other, a hydrogen atom or an unsubstituted monovalent hydrocarbon group having 1 to 20 carbon atoms;

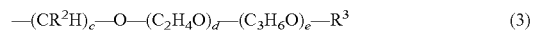

wherein c is an integer of from 2 to 11, d is an integer of from 0 to 100, e is an integer of from 0 to 100, a total of d and e is larger than zero, $R^2$ is as defined above, $R^3$ is an unsubstituted monovalent hydrocarbon group having 1 to 20 carbon atoms, a hydrogen atom or —$COR^4$, wherein $R^4$ is an unsubstituted monovalent hydrocarbon group having 1 to 20 carbon atoms;

wherein $R^5$ is, independently of each other, a hydroxyl group, an alkoxyl group or a substituted or unsubstituted monovalent hydrocarbon group having 1 to 20 carbon atoms, $R^2$ is as defined above, f is an integer of from 2 to 11, and s is an integer of from 0 to 1000.

The present invention further provides the emulsion composition, wherein the siloxane is represented by the following formula (5):

wherein $R^6$ is, independently of each other, a hydroxyl group, an alkoxyl group, a substituted or unsubstituted monovalent hydrocarbon group having 1 to 20 carbon atoms, or a group represented by the aforesaid formula (2) or (3), $R^7$ is, independently of each other, a hydroxyl group, an alkoxyl group, a substituted or unsubstituted monovalent hydrocarbon group having 1 to 20 carbon atoms, a group represented by the aforesaid formula (6), or a group represented by the following formula (7):

wherein $R^5$ is as defined above and t is an integer of from 0 to 1000;

B is the group represented by the aforesaid formula (2), P is the group represented by the aforesaid formula (3), x, y and z are, independently of each other, an integer of from 0 to 2000, a total of x, y and z is larger than zero, at least one of $R^6$ is the group represented by the aforesaid formula (2) when y is zero, at least one of $R^6$ is the group represented by the aforesaid formula (3) when z is zero, and a bonding order of the parenthesized siloxane units is not limited.

Effects of the Invention

The present emulsion composition has a small initial diameter of particles and good stability with time and good dilution stability. Further, the emulsion composition has high adsorb ability to fibers and makes on a surface of fibers hydrophilicity by treatment with it.

BEST MODE OF THE INVENTION

The present invention will be explained below in detail.
Aminoalkyl Group- and Polyoxyalkylene Group-Containing Siloxane The present aminoalkyl- and polyoxyalkylene group-containing siloxane, hereinafter referred to as an aminoalkyl group-containing siloxane, is represented by the following general formula (1):

$$(R^1_3SiO_{1/2})_k(R^1_2SiO_{2/2})_p(R^1SiO_{3/2})_q(SiO_{4/2})_r \quad (1)$$

wherein $R^1$ is, independently of each other, a hydroxyl group, an alkoxyl group, a substituted or unsubstituted monovalent hydrocarbon group having 1 to 20 carbon atoms, or a group represented by the following formula (2), (3) or (6), provided that at least one of $R^1$ is the group represented by the following formula (2) and at least one of $R^1$ is a group represented by the following formula (3), k, p, q and r are, independently of each other, an integer of 0 or more, provided that a total of k, p, q and r is larger than zero, and a bonding order of the parenthesized siloxane units is not limited, $$-(CR^2H)_a-(NHCH_2CH_2)_b-NH_2 \quad (2)$$

wherein a is an integer of from 2 to 11, b is an integer of from 0 to 10, and $R^2$ is, independently of each other, a hydrogen atom or an unsubstituted monovalent hydrocarbon group having 1 to 20 carbon atoms;

$$-(CR^2H)_c-O-(C_2H_4O)_d-(C_3H_6O)_e-R^3 \quad (3)$$

wherein c is an integer of from 2 to 11, d is an integer of from 0 to 100, e is an integer of from 0 to 100, a total of d and e is larger than zero, $R^2$ is as defined above, $R^3$ is an unsubstituted monovalent hydrocarbon group having 1 to 20 carbon atoms, a hydrogen atom or $-COR^4$, wherein $R^4$ is an unsubstituted monovalent hydrocarbon group having 1 to 20 carbon atoms;

$$-(CR^2H)_f-(R^5_2SiO)_s-SiR^5_3 \quad (6)$$

wherein $R^5$ is, independently of each other, a hydroxyl group, an alkoxyl group or a substituted or unsubstituted monovalent hydrocarbon group having 1 to 20 carbon atoms, $R^2$ is as defined above, f is an integer of from 2 to 11, and s is an integer of from 0 to 1000.

In the formula (1), k, p, q and r are, independently of each other, an integer of 0 or more, provided that a total of k, p, q and r is larger than zero. k is preferably an integer of from 2 to 42, further preferably an integer of from 2 to 22, in particular an integer of from 2 to 13. p is preferably an integer of from 1 to 6000, further preferably an integer of from 5 to 1500, in particular an integer of from 10 to 300. q is preferably an integer of from 0 to 20, further preferably an integer of from 0 to 10, in particular an integer of from 0 to 5. r is preferably an integer of from 0 to 10, further preferably an integer of from 0 to 5, in particular an integer of from 0 to 3. The aminoalkyl group-containing siloxane preferably has a weight average molecular weight of 500 to 20,000, in particular 1,000 to 40,000. In the present invention, a weight average molecular weight is determined by gel permeation chromatography (GPC) and reduced to polystyrene. The bonding order of the parenthesized siloxane units is not limited. The siloxane units may be sequenced at random or form a block unit.

In the formula (1), $R^1$ is, independently of each other, a hydroxyl group, an alkoxyl group, a substituted or unsubstituted monovalent hydrocarbon group having 1 to 20 carbon atoms, or a group represented by the following formula (2), (3) or (6), provided that at least one of $R^1$ is the group represented by the following formula (2) and at least one of $R^1$ is a group represented by the following formula (3).

$$-(CR^2H)_a-(NHCH_2CH_2)_b-NH_2 \quad (2)$$

$$-(CR^2H)_c-O-(C_2H_4O)_d-(C_3H_6O)_e-R^3 \quad (3)$$

$$-(CR^2H)_f-(R^5_2SiO)_s-SiR^5_3 \quad (6)$$

Examples of the monovalent hydrocarbon group having 1 to 20 carbon atoms include alkyl groups having 1 to 20 carbon atoms, cycloalkyl groups having 3 to 20 carbon atoms, alkenyl groups having 2 to 20 carbon atoms, aryl groups having 6 to 20 carbon atoms and aralkyl groups having 7 to 20 carbon atoms. For instance, unsubstituted monovalent hydrocarbon group includes alkyl groups such as a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group and a octadecyl group; cycloalkyl groups such as a cyclopentyl group and a cyclohexyl group; alkenyl groups such as a vinyl group and an allyl group; aryl groups such as a phenyl group, a tolyl group and a naphthyl group; and aralkyl groups such as a benzyl group and a phenethyl group. The substituted monovalent hydrocarbon group includes those where a part or the whole of the hydrogen atoms bonded to carbon atoms are replaced with a halogen atom, an amino group, an acryloxy group, a methacryloxy group, an epoxy group, a mercapto group, a carboxyl group and a hydroxyl group.

$R^1$ is preferably a unsubstituted monovalent hydrocarbon group having 1 to 6 carbon atoms such as a methyl group, an ethyl group, a butyl group and a phenyl group, or the group represented by the aforesaid formula (2), (3) or (6). Further, a methyl group, a butyl group, a phenyl group, and the group represented by the aforesaid formula (2), (3) or (6) are further preferable. In particular, a methyl group, a phenyl group, or the group represented by the aforesaid formula (2), (3) or (6) are preferable. At least one of $R^1$ is the group represented by the formula (2) and at least one of $R^1$ is the group represented by the formula (3).

In the formulas (2), (3) and (6), $R^2$ is, independently of each other, a hydrogen atom or an unsubstituted monovalent hydrocarbon group having 1 to 20 carbon atoms. Examples of the unsubstituted monovalent hydrocarbon group having 1 to 20 carbon atoms include alkyl groups having 1 to 20 carbon atoms, cycloalkyl groups having 3 to 20 carbon atoms, alkenyl groups having 2 to 20 carbon atoms, aryl groups having 6 to 20 carbon atoms and aralkyl groups having 7 to 20 carbon atoms. The further detail is as described for $R^1$. $R^2$ is preferably a hydrogen atom or a monovalent hydrocarbon group having 1 to 6 carbon atoms such as a methyl group, an ethyl group, a propyl group, a butyl group and a phenyl group. In particular, a hydrogen atom and a methyl group are preferable.

In the formula (2), a is an integer of from 2 to 11, preferably 2 or 3. b is an integer of from 0 to 10, preferably an integer of from 0 to 5, in particular 0 or 1. Preferably, the structure represented by —(CR²H)$_a$— in the formula (2) is one of the following structures:

—CH$_2$CH$_2$CH$_2$—,   —CMeHCH$_2$—,
—CH$_2$CMeHCH$_2$—
—CH$_2$CMeH—,   —CMeHCH$_2$CH$_2$—,
—CH$_2$CH$_2$CMeH—.

In the formula (3), R³ is an unsubstituted monovalent hydrocarbon group having 1 to 20, preferably 1 to 6 carbon atoms, a hydrogen atom or —COR⁴. R⁴ is an unsubstituted monovalent hydrocarbon group having 1 to 20, preferably 1 to 6 carbon atoms. Examples of the monovalent hydrocarbon group include alkyl groups, cycloalkyl groups, alkenyl groups, aryl groups and aralkyl groups. The further detail is as described for R¹. R⁴ is preferably a methyl group, an ethyl group, a propyl group, a butyl group and a phenyl group. A methyl or butyl group is preferable. R³ is preferably a hydrogen atom, a methyl group, an ethyl group, a propyl group, a butyl group, or —COR⁴. In particular, R³ is a hydrogen atom, a methyl group, a butyl group, —COMe or —COBu.

In the formula (3), c is an integer of from 2 to 11, preferably 2 or 3, in particular 3. d is an integer of from 0 to 100, preferably an integer of from 0 to 50, in particular an integer of from 0 to 25. e is an integer of from 0 to 100, preferably an integer of from 0 to 50, in particular an integer of from 0 to 25, provided that a total of d and e is larger than zero. Preferably, the structure represented by —(CR²H)$_c$— in the formula (3) is one of the following structures:

—CH$_2$CH$_2$CH$_2$—,   —CMeHCH$_2$—,
—CH$_2$CMeHCH$_2$—
—CH$_2$CMeH—,   —CMeHCH$_2$CH$_2$—,
—CH$_2$CH$_2$CMeH—

Preferably, the structure represented by —(C$_3$H$_6$O)$_e$— in the formula (3) is one of the following structures:

—(CH$_2$CH$_2$CH$_2$O)$_e$—
—(CMeHCH$_2$O)$_e$—
—(CH$_2$CMeHO)$_e$—

The units represented by —(C$_2$H$_4$O)$_d$— and —(C$_3$H$_6$O)$_e$— may be sequenced at random or form a block unit.

In the formula (6), R⁵ is, independently of each other, a hydroxyl group, an alkoxyl group or a substituted or unsubstituted monovalent hydrocarbon group having 1 to 20 carbon atoms. Examples of the monovalent hydrocarbon group having 1 to 20 carbon atoms include alkyl groups having 1 to 20 carbon atoms, cycloalkyl groups having 3 to 20 carbon atoms, alkenyl groups having 2 to 20 carbon atoms, aryl groups having 6 to 20 carbon atoms and aralkyl groups having 7 to 20 carbon atoms. The further detail is as described for R¹. R⁵ is preferably an unsubstituted monovalent hydrocarbon group having 1 to 6 carbon atoms such as a methyl group, an ethyl group, a propyl group, a butyl group and a phenyl group. A methyl group a butyl group and a phenyl group are further preferable. In particular, a methyl and phenyl group are preferable.

In the formula (6), f is an integer of from 2 to 11, preferably 2 or 3, in particular 3. s is an integer of from 0 to 1000, preferably an integer of from 4 to 100, in particular an integer of from 4 to 30. Preferably, the structure represented by —(CR²H)$_f$— in the formula (6) is one of the following structures:

—CH$_2$CH$_2$CH$_2$—,   —CMeHCH$_2$—,
—CH$_2$CMeHCH$_2$—
—CH$_2$CMeH—,   —CMeHCH$_2$CH$_2$—,
—CH$_2$CH$_2$CMeH—

The aminoalkyl group-containing siloxane represented by the aforesaid general formula (1) may has a linear, branched, cyclic or three-dimensionally cross-linked structure. A linear or branched siloxane is preferable. The linear or branched siloxane is represented by the following general formula (5):

$$R^6—(R^7{}_2SiO)_x—(R^7BSiO)_y—(R^7PSiO)_z—SiR^7{}_2R^6 \quad (5)$$

In the formula (5), R⁶ is, independently of each other, a hydroxyl group, an alkoxyl group, a substituted or unsubstituted monovalent hydrocarbon group having 1 to 20, preferably 1 to 6 carbon atoms, or a group represented by the aforesaid formula (2) or (3). Examples of the substituted or unsubstituted monovalent hydrocarbon group are as described for R¹. R⁶ is preferably a methyl group, an ethyl group, a propyl group, a butyl group, a phenyl group, or a group represented by the aforesaid formula (2) or (3), in particular, a methyl group, a phenyl group, or a group represented by the aforesaid formula (2) or (3). B is a group represented by the aforesaid formula (2), and P is a group represented by the aforesaid formula (3). The aminoalkyl group-containing siloxane has at least one group represented by the formula (2) and at least one polyoxyalkylene group represented by the formula (3). A bonding order of the parenthesized siloxane units is not limited. The parenthesized siloxane units may be sequenced at random or form a block unit.

In the formula (5), R⁷ is, independently of each other, a hydroxyl group, an alkoxyl group, a substituted or unsubstituted monovalent hydrocarbon group having 1 to 20, preferably 1 to 6 carbon atoms, a group represented by the aforesaid formula (6), or a group represented by the following formula (7). Examples of the substituted or unsubstituted monovalent hydrocarbon group are as described for R¹. R⁷ is preferably a hydrocarbon group having 1 to 6 carbon atoms, a group represented by the aforesaid formula (6), or a group represented by the following formula (7), for instance, a methyl group, an ethyl group, a propyl group, a butyl group, a phenyl group, or a group represented by the formula (6) or (7). Preferably, R⁷ is a methyl group, a butyl group, a phenyl group, or a group represented by the formula (6) or (7). In particular, R⁷ is a methyl group, a phenyl group, or a group represented by the formula (6) or (7).

$$—O—(R^5{}_2SiO)_t—SiR^5{}_3 \quad (7)$$

wherein R⁵ is as defined above and t is an integer of from 0 to 1000, preferably an integer of from 0 to 100, further preferably an integer of from 4 to 30.

In the formula (5), x is an integer of from 0 to 2000, preferably an integer of from 0 to 500, further preferably an integer of from 5 to 100, further preferably an integer of from 5 to 50. y is an integer of from 0 to 2000, preferably an integer of from 0 to 500, further preferably an integer of from 1 to 100, further preferably an integer of from 2 to 20. z is an integer of from 0 to 2000, preferably an integer of from 0 to 500, further preferably an integer of from 1 to 100, further preferably an integer of from 2 to 20. A total of x, y and z is larger than zero, preferably 10 or larger. At least one of R⁶ is the group represented by the aforesaid formula (2) when y is zero. At least one of R⁶ is the group represented by the aforesaid formula (3) when z is zero. The aminoalkyl group-containing siloxane preferably has a weight average molecular weight of 500 to 200,000, in particular 1,000 to 40,000. In the present invention, the weight average molecular weight is determined by gel permeation chromatography (GPC) and reduced to polystyrene.

The aminoalkyl group-containing siloxane may be prepared according to any known manners. For instance, the aminoalkyl group- and polyoxyalkylene group-containing organopolysiloxane is obtained by addition reacting a hydrogenpolydiorganosiloxane with allylamine and, then, further addition reacting the remaining SiH group with a polyether compound having an allyl group. The aminoalkyl group-containing siloxane is also obtained by equilibrating a polyether-modified siloxane, octamethylcyclotetrasiloxane and a hydrolysate of 3-aminopropylmethyldimethoxysilane in the presence of a KOH catalyst.

The present aminoalkyl group-containing siloxane is preferably prepared by a method comprising a step of addition reacting the following compound (A) with the following compounds (B) and (C) and optionally the following compound (D) and a step of detaching the silyl group represented by the following Q from the amino group, (hereinafter referred to as deprotection). According to this method, the reaction proceeds sufficiently even with a small amount of a catalyst and no unreacted hydrosilyl group remains. Further, an amount of cyclic siloxanes such as octamethylcyclotetrasiloxane and decamethylcyclopentasiloxane, which are impurities in the product, is smaller.

(A) a hydrogensiloxane represented by the following general formula (9):

$$(R^8{}_3SiO_{1/2})_k(R^8{}_2SiO_{2/2})_p(R^8{}_1SiO_{3/2})_q(SiO_{4/2})_r \qquad (9)$$

wherein $R^8$ is, independently of each other, a hydrogen atom, a hydroxyl group, an alkoxyl group, or a substituted or unsubstituted monovalent hydrocarbon group having 1 to 20 carbon atoms, provided that at least one of $R^8$ is a hydrogen atom, k, p, q and r are as defined above and a bonding order of the parenthesized siloxane units is not limited;

(B) a compound represented by the following formula (10) and having a protected amino group:

$$CHR^2=CR^2-(CR^2H)_{a'}-(NQCH_2CH_2)_b-NQ_2 \qquad (10)$$

wherein a' is "a" minus 2, that is, an integer of from 0 to 9, b and $R^2$ are as defined above, Q is a silyl group represented by $-SiR^9{}_3$, wherein $R^9$ is, independently of each other, an unsubstituted monovalent hydrocarbon group having 1 to 20 carbon atoms;

(C) a polyether represented by the following formula (11):

$$CHR^2=CR^2-(CR^2H)_{c'}-O-(C_2H_4O)_d-(C_3H_6O)_e-R^3 \qquad (11)$$

wherein c' is c minus 2, that is, an integer of from 0 to 9, and d, e, $R^2$ and $R^3$ are as defined above, (D) a (poly)siloxane represented by the following formula (12):

$$CHR^2=CR^2-(CR^2H)_{f'}-(R^5{}_2SiO)_s-SiR^5{}_3 \qquad (12)$$

wherein f' is f minus 2, that is, an integer of from 0 to 9, and $R^2$, $R^5$ and s are as defined above.

The hydrogensiloxane (A) represented by the aforesaid formula (9) is preferably linear or blanched hydrogensiloxane (A') represented by the following general formula (13). When the hydrogensiloxane (A') is used as a starting material, the aminoalkyl group-containing linear or blanched siloxane represented by the general formula (5) is obtained.

$$(A')R^{11}-(R^{10}{}_2SiO)_v-SiR^{11}{}_3 \qquad (13).$$

In the formula (13), $R^{11}$ is, independently of each other, a hydrogen atom, a hydroxyl group, an alkoxyl group, or a substituted or unsubstituted monovalent hydrocarbon group having 1 to 20 carbon atoms, $R^{10}$ is, independently of each other, a hydrogen atom, a hydroxyl group, an alkoxyl group, a substituted or unsubstituted monovalent hydrocarbon group having 1 to 20 carbon atoms, or the group represented by the aforesaid formula (7), provided that at least one of $R^{10}$ and $R^{11}$ is a hydrogen atom. v is a total of x, y and z, i.e. v is an integer of from 1 to 6000, preferably an integer of from 1 to 1500, further preferably an integer of from 7 to 300, more preferably an integer of from 9 to 90. A bonding order of the parenthesized siloxane units is not limited. The siloxane units may be sequenced at random or form a block unit.

The addition reaction is preferably conducted in the presence of a catalyst which may be a well-known addition reaction catalyst. Examples of the catalyst include a metal catalyst having platinum, palladium, rhodium, ruthenium, gold or nickel. A catalyst having platinum, palladium or rhodium is preferable, particularly platinum. The catalyst may be used singly or in combination of two or more of them. Particularly, a complex of a chloroplatinic acid neutralized with sodium hydrogen carbonate, and 1,1,3,3-tetramethyl-1,3-divinyldisiloxane, i.e. Karstedt catalyst, is most preferable as an addition reaction catalyst.

The catalyst may be used in a catalytic amount. The catalytic amount is such that the addition reaction proceeds sufficiently. For instance, the amount of the catalyst is such that the amount of a metal is 0.02 part by mass or less, preferably 0.0001 to 0.02 part by mass, preferably 0.00003 to 0.01 part by mass, more preferably 0.0005 to 0.005 part by mass, relative to 100 parts by mass of compound (A) or (A'). If the amount of the catalyst is too small, the reaction rate is too slow. Therefore, the aforesaid lower limit or more of the amount is preferable.

The amounts of compound (B) and the optional compounds (C) and (D) to be subjected to the addition reaction are such that the total number of the alkenyl groups of compound (B) and the optional compounds (C) and (D) is larger than or equal to the number of the SiH group of compound (A). For instance, a ratio of the total number of the alkenyl groups to the number of the SiH group is 1 to 5, preferably 1 to 2, particularly 1 to 1.5.

The aforesaid addition reaction may be carried out in the presence of at least one solvent. Examples of the solvent include toluene, xylene, benzene, hexane, cyclohexanone, methylcyclohexanone, ethylcyclohexanone, chloroform, dichloromethane, carbon tetrachloride, THF, diethyl ether, acetone, methyl ethyl ketone, DMF, acetonitrile, methanol, ethanol, 1-propanol, 2-propanol, 1-butanol and 2-butanol. The solvent may be distilled off or not after the addition reaction.

The reaction temperature is 20 to 250 degrees C., preferably 40 to 180 degrees C., further preferably 80 to 120 degrees C. The reaction time is within 20 hours, preferably within 12 hours, particularly within 8 hours.

After the addition reaction, steps of deprotection, neutralization and removing the solvent, and optionally decoloration, deodorization or filtration, are carried out to obtain the aforesaid aminoalkyl group-containing siloxane. The deprotection is carried out in the presence of a known catalyst and a solvent, according to the known manner. The catalyst is preferably acetic acid, hydrochloric acid, sulfuric acid, methanesulfonic acid and trifluoromethanesulfonic acid. The solvent is preferably a protonic solvent.

The present invention provides an emulsion composition containing the aminoalkyl group-containing siloxane and water. The aminoalkyl group-containing siloxane has a hydrophilic group and, accordingly may be emulsified by mixing it with water. Self-emulsification of the aminoalkyl group-containing siloxane proceeds depending on the amount of the polyoxyalkylene contained in the siloxane, that is, a ratio of modification by the polyoxyalkylene. The amount of the aminoalkyl group-containing siloxane in the emulsion composition is properly decided so that the aminoalkyl group-containing siloxane can cause self-emulsification in water. For instance, the amount of the aminoalkyl group-containing siloxane is 0.01 to 99.9 mass %, preferably 0.1 to 90 mass %, further preferably 1 to 70 mass %, based on a total amount of the emulsion composition. The amount of water is 0.01 to 99.9 mass %, preferably 10 to 99.9 mass %, further preferably 30 to 99 mass %, based on the total amount of the emulsion composition. If the aminoalkyl group-containing siloxane cannot cause self-emulsification, a surfactant may be added to the emulsion composition. The amounts of the surfactant in this case may be properly decided.

[Surfactant]

The present invention further provides an emulsion composition comprising the aforesaid aminoalkyl-group containing siloxane, water and a surfactant. Any known surfactant can be used. For instance, a nonionic surfactant, an anionic surfactant, a cationic surfactant and an ampholytic surfactant can be used.

Examples of the nonionic surfactant include lecithin derivatives, propylene glycol fatty acid ester, glycerine fatty acid ester, poly glycerine fatty acid ester, polyoxyalkylene glycerine fatty acid ester, sorbitan fatty acid ester, polyoxyalkylene sorbitan fatty acid ester, polyoxyalkylene sorbit fatty acid ester, polyoxyalkylene lanolin derivatives, polyoxyalkylene lanolin alcohol derivatives, polyoxyalkylene beeswax derivatives, polyoxyalkylene hardened castor oil, polyoxyalkylene sterol, polyoxyalkylene hydrogenated sterol, polyoxyalkylene alkylether, polyoxyalkylene alkylphenyl ether, polyoxyalkylene glycol fatty acid ester, alkyl alkanolamide, and alkyl polyglycoside. In the present invention, oxyalkylene means oxyethylene and oxypropylene and the oxyethylene unit and the oxypropylene unit may form a block polymeric part or a random polymeric part. The alkyl group generally has 6 to 30 carbon atoms and may be linear or branched and may be unsaturated hydrocarbon group. Among these, polyoxyalkylene alkyl ether represented by the general formula $R^6O(EO)_p(PO)_qH$ is preferred, wherein $R^6$ is a linear or branched alkyl group having 6 to 20 carbon atoms, EO is abbreviation of ethylene oxide and PO is abbreviation of propylene oxide. The oxyethylene unit and the oxypropylene unit may form a block polymeric part or a random polymeric part. p and q are, independently of each other, an integer of from 0 to 100, provided that a total of p and q is more than zero. In particular, $R^6$ is a linear or branched alkyl group having 8 to 14 carbon atoms and p and q are, independently of each other, 0 to 50, further preferably 0 to 25.

Examples of the anionic surfactant include N-acylamino acid and a salt thereof, alkylether carboxylic acid and a salt thereof, polyoxyalkylene alkylether acetic acid and a salt thereof, fatty acid soap, alkyl phosphoric acid and a salt thereof, polyoxyalkylene alkylether phosphoric acid and a salt thereof, N-acyl taurine and a salt thereof, alkyl sulfuric acid and a salt thereof, polyoxyalkylene alkylether sulfuric acid and a salt thereof, alkylbenzene sulfonic acid and a salt thereof, polyoxyalkylene alkyl benzene sulfonic acid and a salt thereof, α-olefin sulfonic acid and a salt thereof, alkyl sulfosuccinic acid and a salt thereof, and polyoxyalkylene alkyl sulfosuccinic acid and a salt thereof. Examples of salt include a salt of an alkali metal, an alkali earth metal or an amine. In the present invention, oxyalkylene means oxyethylene and oxypropylene and the oxyethylene unit and the oxypropylene unit may form a block polymeric part or a random polymeric part. The alkyl group generally has 6 to 30 carbon atoms and may be linear or branched and may be unsaturated hydrocarbon group. Among these, preferred are alkylether carboxylic acid and a salt thereof, polyoxyethylene alkylether acetic acid and a salt thereof, alkyl sulfuric acid and a salt thereof, alkyl benzene sulfonic acid and a salt thereof and polyoxyalkylene alkylether sulfuric acid and a salt thereof, which have a linear or branched alkyl group having 6 to 20 carbon atoms. In particular, alkyl sulfuric acid and a salt thereof and polyoxyethylene alkylether sulfuric acid and a salt thereof, which have a linear or branched alkyl group having 8 to 14 carbon atoms, are preferable.

Examples of the salt include an alkali metal salt such as a lithium salt, a sodium salt, a potassium salt, an alkali earth metal salt such as a magnesium salt and a calcium salt, a triethanol ammonium salt and an ammonium salt. In particular, a sodium salt, a potassium salt, a triethanol ammonium salt and an ammonium salt are preferable.

Examples of the cationic surfactant include quaternary ammonium halides such as alkyltrimethylammonium halides and dialkyldimethylammonium halides, alkoxypropyltrimethylammnonium halides, benzalkonium halides and alkyl phosphorylate benzalkonium halides. The alkyl group generally has 6 to 30 carbon atoms, may be linear or branched and may further has unsaturated bond. Among these, alkyltrimethylammonium halides and dialkyldimethylammonium halides with the alkyl being linear or branched and having 6 to 20 carbon atoms are preferred.

Examples of the ampholytic surfactant include aminoacetic betaines such as alkyldimethylaminoacetic betaine, amine oxides such as alkyldimethylamineoxide, alkyl carboxymethyl hidroxyethylimidazorium betaine, alkyl fatty acid amidepropyl betaine, alkylamidepropyl betaine, alkyl glycinate, alkyl carboxyglycinate, alkyl amphopropionate and alkyl amidepropyl hydroxy sultaine, acyl taurate and acyl glutamate. The alkyl group generally has 6 to 30 carbon atoms and may be linear or branched and may be unsaturated hydrocarbon group.

The aforesaid surfactants may be used singly or in combination of two or more of them. The amount of the surfactant in the emulsion composition may be 0 to 200 parts by mass, preferably 0.1 to 100 parts by mass, further preferably 1 to 20 parts by mass, relative to 100 parts by mass of the aminoalkyl group-containing siloxane. When the surfactant is contained in the aforesaid amount, emulsification stability of the composition is improved and the properties of the aminoalkyl group-containing siloxane are well exhibited.

[Other Components]

The present emulsion composition may further comprise other components besides the aminoalkyl group-containing siloxane, water, and the surfactant. Examples of other components include acids, storage stabilizers, hydrocarbons, esters, alcohols, powder, and water-soluble polymers. The amount of the other components may be properly decided as in the conventional emulsion compositions as long as the effects of the present invention are not obstructed.

[Acid]

The present emulsion composition may comprise an acid. When the aminoalkyl group-containing siloxane is emulsified, an acid such as carboxylic acid is added to form a salt by neutralization and, thereby, the siloxane is easily emulsified and a smaller diameter of emulsion particles is attained. Examples of the acid include acetic acid, propionic acid, higher fatty acids such as palmitic acid and stearic acid, lactic acid, hydrochloric acid, sulfuric acid and nitric acid.

The amount of the acid in the emulsion composition may be generally such an amount that a molar amount of the acid is 0.01 to 1, preferably 0.05 to 0.8, further preferably 0.1 to 0.5, relative to a mole of the amino group of the aminoalkyl group-containing siloxane in the emulsion composition, but not limited to these.

[Storage Stabilizer]

The storage stabilizer includes a preservative agent, an antimicrobial agent and a pH adjuster. The preservative agent and the antimicrobial agent function to prevent decomposition of the emulsion. The amount of the storage stabilizer in the emulsion composition may be generally 0.01 to 10 mass %, preferably 0.05 to 5 mass %, further preferably 0.1 to 3 mass %, but not limited to these.

[Hydrocarbons]

Examples of hydrocarbons include a liquid paraffin, vaseline, solid paraffin, squalane and an olefin oligomer. The amount of the hydrocarbons in the emulsion composition may be generally 0.01 to 10 mass %, preferably 0.05 to 5 mass %, further preferably 0.1 to 3 mass %, but not limited to these.

[Esters]

Examples of esters include isopropyl palmitate, stearyl stearate, octyldodecyl myristate, octyldodecyl oleate, acetylated lanolin and 2-ethylhexanoic acid triglyceride. The amount of the esters in the emulsion composition may be generally 0.01 to 10 mass %, preferably 0.05 to 5 mass %, further preferably 0.1 to 3 mass %, but not limited to these.

[Alcohols]

Examples of alcohols include ethanol, lauryl alcohol, cetyl alcohol, stearyl alcohol, lanolin alcohol, beeswax, ethylene glycol, propylene glycol, butylene glycol, glycerin and sorbitol. The amount of the alcohols in the emulsion composition may be generally 0.01 to 10 mass %, preferably 0.05 to 5 mass %, further preferably 0.1 to 3 mass %, but not limited to these.

[Powders]

Examples of powders include inorganic powders such as titanium oxide, carbon black, iron oxide, sericite, talc, kaolin and mica, and organic polymer powders such as nylon, polyethylene and poly(meth)acrylic acid ester. The amount of the powder in the emulsion composition may be generally 0.01 to 10 mass %, preferably 0.05 to 5 mass %, further preferably 0.1 to 3 mass %, but not limited to these.

[Water-Soluble Polymers]

Examples of water-soluble polymers include pectin, guar gum, xanthane gum, tamarind gum, carrageenan, carboxymethyl cellulose, starch, soluble starch, dextrin, α-starch, sodium alginate, gum arabic, gelatin, tragacanth gum, locust bean gum, casein, lignosulfonate, carboxymethylcellulose sodium salt, methylcellulose, hydroxyethylcellulose, carboxymethyl starch sodium salt, hydroxyethyl starch, starch phosphate ester sodium salt, polyvinyl alcohol, polyvinyl methyl ether, polyacrylamide, sodium polyacrylate, co-polymer of partially saponified acetic acid and vinyl ether, acrylic acid, methacrylic acid, maleic acid, and a polymer or a copolymer of an ester or a salt of these, hydroxypropylcellulose (HPC), hydroxypropyl methylcellulose, polyvinylpyrrolidone, a copolymer of vinylpyrrolidone and vinyl acetate. The amount of the water-soluble polymer in the emulsion composition may be generally 0.01 to 10 mass %, preferably 0.05 to 5 mass %, further preferably 0.1 to 3 mass %, but not limited to these.

The present emulsion composition may be prepared according to any known manners and may be prepared by mixing the aminoalkyl group-containing siloxane, water, and optionally the surfactant and the other components to emulsify. The mixing and emulsification may be conducted with a conventional apparatus. Examples of the apparatus include an emulsification equipment such as a homodisper, a homomixer, a colloid mill, a line mixer, an omnipotent mixer, an ultra mixer, a planetary mixer, a combi mix, and a high-pressure homogenizer.

EXAMPLES

The present invention will be explained below in further detail with reference to a series of the Examples and the Comparative Examples, though the present invention is in no way limited by these Examples.

In the following Examples and Comparative Examples, the units represented by M, D, $D^{POE}$, $D^{Amine}$ and $D^{R1}$ are as follows.

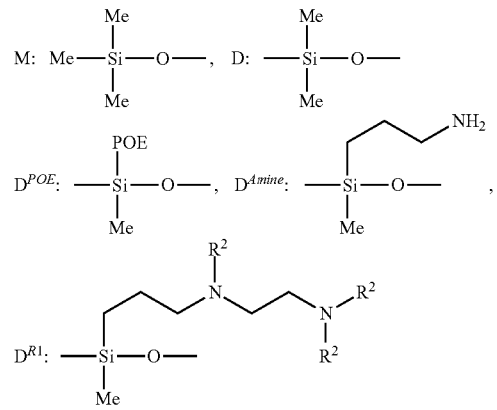

wherein POE is a group represented by $-C_3H_6O(C_2H_4O)_3-H$, $R^2$ is a group represented by $-CH_2CHOHCH_2O(C_2H_4O)_5Bu$ and Bu is n-butyl group.

The surfactant used in the following Examples and Comparative Examples is poly(oxyethylene)alkylether, SANNONIC SS-120, ex Sanyo Chemical Industries, Ltd.

In the following synthesis examples 1 and 2, the 1H-NMR analyses were conducted with ECX-500II, ex JEOL Ltd. The determination solvent in the $^1$H-NMR was deuterated chloroform.

In the following Examples and Comparative Examples, the total amount of the cyclic siloxanes contained in the hydrogensiloxane was 10 ppm or less, that is, 0.001 part by mass or less, relative to 100 parts by mass of the hydrogensiloxane. The cyclic siloxanes herein are compounds represented by $(Me_2SiO)_3(MeHSiO)_1$, $(Me_2SiO)_4(MeHSiO)_1$, $(Me_2SiO)_5(MeHSiO)_1$ or $(Me_2SiO)_6(MeHSiO)_1$.

Synthesis Example 1

32.27 Parts by mass of an allylpolyether represented by $CH_2=CH-(CH_2)-O-(C_2H_4O)_3-H$ and 0.0167 part by mass of a solution of a complex of a chloroplatinic acid neutralized with sodium hydrogen carbonate and a vinyl siloxane in ethanol, containing 3.0 wt % of platinum, were added to 100 parts by mass of a hydrogensiloxane represented by a general formula: Me-$(Me_2SiO)_{30}$-$(MeHSiO)_5$—SiMe$_3$, and heated with stirring at 100 degrees C. for 2 hours. Then, 16.16 parts by mass of bis(trimethylsilyl)allylamine represented by $CH_2=CH-(CH_2)-NTMS_2$ and 0.0333 part by mass of a solution of a complex of a chloroplatinic acid neutralized with sodium hydrogen carbonate and a vinyl siloxane in ethanol, containing 3.0 wt % of platinum, were added to the mixture. The mixture was further heated with stirring at 100 degrees C. for 4 hours. Then, 0.96 part by mass of acetic acid and 100 parts by mass of isopropyl alcohol were added to the mixture and heated with stirring at 80 degrees C. for 3 hours, to which 8 parts by mass of Kyowado™ 500 was added as a neutralizing agent, stirred at room temperature for 2 hours, then, the solvent was removed at 100 degrees C. and 10 mmHg and, then, Kyowado™ 500 was filtrated off with a filter, NA-500, ex Advantech Co., Ltd., to obtain a product. The total amount of the catalyst used in the aforesaid reactions was such that an amount of the platinum metal was 0.0015 part by mass, relative to 100 parts by mass of the hydrogensiloxane. The product was analyzed by $^1$H-NMR to find that it was represented by the following general formula:

Me-(Me$_2$SiO)$_{30}$-(MeBSiO)$_1$-(MePSiO)$_4$—SiMe$_3$ wherein B is —C$_3$H$_6$NH$_2$, P is —C$_3$H$_6$O(C$_2$H$_4$O)$_3$—H and the bonding order of the parenthesized siloxane units is not limited. In the following description, this compound is represented by $M_2D_{28}D^{POE}_4D^{Amine}_1$.

Synthesis Example 2

The procedures of Synthesis Example 1 were repeated to obtain a product except that the amount of the allylpolyether represented by CH$_2$=CH—(CH$_2$)—O—(C$_2$H$_4$O)$_3$—H was 20.17 parts by mass, the amount of bis(trimethylsilyl)allylamine represented by CH$_2$=CH—(CH$_2$)—NTMS$_2$ was 24.23 parts by mass, the amount of acetic acid was 1.44 parts by mass and the amount of Kyowado™ 500 was 12 parts by mass. The product was analyzed by $^1$H-NMR to find that it was represented by the following general formula:

Me-(Me$_2$SiO)$_{30}$-(MeBSiO)$_2$-(MePSiO)$_3$—SiMe$_3$ wherein B is —C$_3$H$_6$NH$_2$, P is —C$_3$H$_6$O(C$_2$H$_4$O)$_3$—H and the bonding order of the parenthesized siloxane units is not limited. In the following description, this compound is represented by $M_2D_{28}D^{POE}_3D^{Amine}_2$.

Comparative Synthesis Example 1

55.5 Parts by mass of a bis(trimethylsilyl)allylamine represented by CH$_2$=CH—(CH$_2$)—NTMS$_2$, 0.0333 part by mass of a solution of a complex of a chloroplatinic acid neutralized with sodium hydrogen carbonate and a vinyl siloxane in ethanol, containing 3.0 wt % of platinum, were added to 100 parts by mass of a hydrogensiloxane represented by a general formula: Me-(Me$_2$SiO)$_{30}$-(MeHSiO)$_4$—SiMe$_3$, and heated with stirring at 100 degrees C. for 4 hours. Then, 3.32 parts by mass of acetic acid and 100 parts by mass of isopropyl alcohol were added to the mixture and heated with stirring at 80 degrees C. for 3 hours, to which 27.4 parts by mass of Kyowado™ 500 was added as a neutralizing agent, stirred at room temperature for 2 hours, then, the solvent was removed at 100 degrees C. and 10 mmHg and, then, Kyowado™ 500 was filtrated off with a filter, NA-500, ex Advantech Co., Ltd., to obtain a product. The product was analyzed by $^1$H-NMR to find that it was represented by the following general formula:

Me-(Me$_2$SiO)$_{30}$-(MeBSiO)$_4$—SiMe$_3$ wherein B is —C$_3$H$_6$NH$_2$ and the bonding order of the parenthesized siloxane units is not limited. In the following description, this compound is represented by $M_2D_{28}D^{Amine}_4$.

Example 1

90 Parts by mass of water was added to 5 parts by mass of SANNONIC SS-120 and solved homogeneously, to which 5 parts by mass of the aminoalkyl group-containing siloxane represented by $M_2D_{28}D^{POE}_4D^{Amine}_1$, prepared in Synthesis Example 1, was added. The mixture was stirred for 5 minutes with a homodisper at a rotation speed of 1000 rpm to obtain emulsion composition 1.

Example 2

90 Parts by mass of water was added to 5 parts by mass of SANNONIC SS-120 and solved homogeneously, to which 5 parts by mass of the aminoalkyl group-containing siloxane represented by $M_2D_{28}D^{POE}_3D^{Amine}_2$, prepared in Synthesis Example 2, was added. The mixture was stirred for 5 minutes with a homodisper at a rotation speed of 1000 rpm to obtain emulsion composition 2.

Comparative Example 1

Preparation of an Emulsion Composition Containing an Aminoalkyl Group-Containing Siloxane Having No Polyoxyalkylene Group 90 Parts by mass of water was added to 5 parts by mass of SANNONIC SS-120 and solved homogeneously, to which 5 parts by mass of the aminoalkyl group-containing siloxane represented by $M_2D_{28}D^{Amine}_4$, prepared in Comparative Synthesis Example 1, was added. The mixture was stirred for 5 minutes with a homodisper at a rotation speed of 1000 rpm to obtain emulsion composition 3.

Comparative Example 2

Preparation of an Emulsion Composition Containing a Polyoxyalkylene Group-Containing Siloxane Having No Aminoalkylene Group 90 Parts by mass of water was added to 5 parts by mass of SANNONIC SS-120 and solved homogeneously, to which 5 parts by mass of a polyether group-containing siloxane represented by $M_2D_{27}D^{POE}_3$, ex Shin-Etsu Chemical Co., Ltd., was added. The mixture was stirred for 5 minutes with a homodisper at a rotation speed of 1000 rpm to obtain emulsion composition 4.

Comparative Example 3

Preparation of an Emulsion Composition Containing a Polyoxysiloxane Having No Aminoalkylene Group and No Polyoxyalkylene Group 90 Parts by mass of water was added to 5 parts by mass of SANNONIC SS-120 and solved homogeneously, to which 5 parts by mass of a polysiloxane represented by MeO-D$^{R1}_{40}$D$^{R1}$-Me, ex Shin-Etsu Chemical Co., Ltd., was added. The mixture was stirred for 5 minutes with a homodisper at a rotation speed of 1000 rpm to obtain emulsion composition 5.

[Evaluation]

The initial emulsifiability, the stability with time and the dilution stability of emulsion compositions 1 to 5 were evaluated according to the following manners. The results are as shown in Table 1. In the following, the particle diameter was the mean particle diameter which was determined by Dynamic Light-Scattering Particle Size Analyzer, N4 Plus Submicron Particle Size Analyzer, ex. Beckman Coulter, Inc.

[Initial Emulsifiability]

The particle diameter of the emulsion particles was determined shortly after the preparation of the emulsion composition. When the diameter is 100 nm or smaller, the initial emulsifiability was evaluated as good.

[Stability with Time]

The emulsion composition was stored for one week at room temperature and, then, the diameter of the emulsion particles was determined. When a change in diameter from the initial diameter is smaller, the stability with time is better. A ratio of the diameter to the initial diameter was calculated according to the following equation. When the value is 5 or smaller, the stability with time was evaluated as good.

Ratio=Diameter after stored/Initial diameter

Dilution Stability

2 Parts by mass of the emulsion composition was diluted with 98 parts by mass of water. The appearance of the dilution was observed with the naked eye. When an interference layer was observed on the surface of the dilution, the dilution stability was evaluated as bad.

TABLE 1

|  | Example 1 | Example 2 | Com. Example 1 | Com. Example 2 | Com. Example 1 |
|---|---|---|---|---|---|
| Initial diameter, nm | 4 | 30 | 169 | 27 | 7 |
| Diameter after stored, nm | 14 | 123 | 188 | 209 | 13 |
| Ratio of Diameter | 3.5 | 4.1 | 1.1 | 7.7 | 1.9 |
| Dilution Stability | Good | Good | Bad | Good | Good |
| Interference Layer | None | None | Observed | None | None |

The emulsion compositions of Examples 1 and 2 had the good initial emulsifiability, stability with time and dilution stability. In contrast, the emulsion composition of Comparative Example 1 had the bad initial emulsifiability and the initial diameter of the emulsion particles was so large as 169 nm, and its dilution stability was poor. The emulsion composition of Comparative Example 2 had the good initial emulsifiability, but the diameter increased sevenfold or more from the initial diameter and, therefore, the stability with time was poor.

Evaluation of a Fiber Treating Property

A cloth composed of 65% of polyester and 35% of cotton was soaked in the emulsion composition, air-dried and heated at 130 degrees C. for 2 minutes. The cloth was washed and dewatered with a laundry machine and dried. The amount of the siloxane adsorbed on the cloth was determined before and after washing with a fluorescence X-ray analyzer, ZSXPrimus2, ex Rigaku Corporation, to evaluate the adsorptive property of the emulsion composition. Further, 8 μl of water was dropped on the cloth surface treated with the emulsion composition and a time for all of the water to be absorbed was determined to evaluate the water absorption property. The results are as shown in Tables 2 and 3. In the Table 2, control is an untreated cloth.

TABLE 2

|  | Control | | Example 1 | | Example 2 | |
|---|---|---|---|---|---|---|
|  | Before washing | After washing | Before washing | After washing | Before washing | After washing |
| Amount of the siloxane adsorbed, g/m² | 0 | 0 | 0.07 | 0.04 | 0.06 | 0.05 |
| Water absorption time, second | 11 | 2 | 6 | 7 | 8 | 8 |

TABLE 3

|  | Comparative Example 1 | | Comparative Example 2 | | Comparative Example 3 | |
|---|---|---|---|---|---|---|
|  | Before washing | After washing | Before washing | After washing | Before washing | After washing |
| Amount of the siloxane adsorbed, g/m² | 0.1 | 0.09 | 0.02 | 0 | 0.06 | 0.02 |
| Water absorption time, seconds | 100 or more | 31 | 4 | 5 | 4 | 34 |

In the cloths treated with the emulsion compositions in Examples 1 and 2, the amounts of the siloxane adsorbed on the cloths were almost same between before and after washing. 0.04 g/m² or more siloxane was adsorbed on the cloth after washing. That is, the present emulsion composition has a good adsorption property to a cloth. In contrast, for the emulsion composition prepared in Comparative Example 1, the amount of the siloxane adsorbed on the cloth was good, but the water absorption time was larger than 30 seconds, so that the water absorption property was poor. For the emulsion composition prepared in Comparative Example 2, the amount of the siloxane adsorbed on the cloth before washing was small so that the emulsion composition was substantively not adsorbed on the surface of the fibers. For the emulsion composition prepared in Comparative Example 3, the amount of the siloxane adsorbed on the cloth before washing was large, but the amount decreased so much after washing. Further, the water absorption time after washing was long. This means that the surface of the fibers became water repellent.

The present emulsion composition has a smaller initial diameter and good stability with time and dilution stability. Further, the emulsion composition has a high adsorption ability to fibers and the surface of the fibers treated with the composition is hydrophilic. Therefore, the present emulsion composition is usable as a fiber treatment agent.

The invention claimed is:

1. An emulsion composition comprising water and an aminoalkyl group and polyoxyalkylene group-containing siloxane represented by the following general formula (5):

$$R^6-(R^7_2SiO)_x-(R^7BSiO)_y-(R^7PSiO)_z-SiR^7_2R^6 \quad (5)$$

wherein $R^6$ is, independently of each other, a hydroxyl group, a substituted or unsubstituted monovalent hydrocarbon group having 1 to 20 carbon atoms, or a group represented by the following formula (2) or (3), $R^7$ is, independently of each other, a hydroxyl group, a substituted or unsubstituted monovalent hydrocarbon group having 1 to 20 carbon atoms, or a group represented by the following formula (7):

$$—(CR^2H)_a—(NHCH_2CH_2)_b—NH_2 \quad (2)$$

wherein a is an integer of from 2 to 11, b is an integer of from 0 to 10, and $R^2$ is, independently of each other, a hydrogen atom or an unsubstituted monovalent hydrocarbon group having 1 to 20 carbon atoms;

$$—(CR^2H)_c—O—(C_2H_4O)_d—(C_3H_6O)_e—R^3 \quad (3)$$

wherein c is an integer of from 2 to 11, d is an integer of from 0 to 100, e is an integer of from 0 to 100, a total of d and e is larger than zero, $R^2$ is as defined above, $R^3$ is an unsubstituted monovalent hydrocarbon group having 1 to 20 carbon atoms, a hydrogen atom or —$COR^4$, wherein $R^4$ is an unsubstituted monovalent hydrocarbon group having 1 to 20 carbon atoms;

$$—O—(R^5{}_2SiO)_t—SiR^5{}_3 \quad (7)$$

wherein $R^5$ is, independently of each other, a hydroxyl group, an alkoxyl group or a substituted or unsubstituted monovalent hydrocarbon group having 1 to 20 carbon atoms and t is an integer of from 0 to 1000; and B is the group represented by the aforesaid formula (2), P is the group represented by the aforesaid formula (3), x is an integer of from 5 to 30, y is an integer of from 0 to 500, and z is an integer of from 0 to 500, a total of x, y and z is 10 or larger, at least one of $R^6$ is the group represented by the aforesaid formula (2) when y is zero, at least one of $R^6$ is the group represented by the aforesaid formula (3) when z is zero, and a bonding order of the parenthesized siloxane units is not limited.

2. The emulsion composition according to claim 1, further comprising a surfactant in an amount of 0.1 to 100 parts by mass, relative to 100 parts by mass of the siloxane.

3. The emulsion composition according to claim 1 or 2, wherein "e" in the group represented by the formula (3) is zero.

* * * * *